United States Patent
Furusawa et al.

(10) Patent No.: US 9,253,387 B2
(45) Date of Patent: Feb. 2, 2016

(54) CAMERA MODULE AND CAMERA APPARATUS AND PARALLEL LINK MECHANISM FOR RECIPROCATING AN IMAGE PICKUP DEVICE

(71) Applicant: SONY CORPORATION, Minato-ku (JP)

(72) Inventors: Toshihiro Furusawa, Kanagawa (JP); Yoshihito Higashitsutsumi, Kanagawa (JP); Yoshiteru Kamatani, Kanagawa (JP); Yukihisa Kinugasa, Tokyo (JP); Hideo Kawabe, Saitama (JP); Takehisa Ishida, Tokyo (JP); Yusaku Kato, Tokyo (JP); Nobuyuki Nagai, Kanagawa (JP); Masayoshi Morita, Tokyo (JP); Hiroyuki Yamagishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/385,911

(22) PCT Filed: Feb. 28, 2013

(86) PCT No.: PCT/JP2013/055356
§ 371 (c)(1),
(2) Date: Sep. 17, 2014

(87) PCT Pub. No.: WO2013/140978
PCT Pub. Date: Sep. 26, 2013

(65) Prior Publication Data
US 2015/0070565 A1   Mar. 12, 2015

(30) Foreign Application Priority Data

Mar. 23, 2012 (JP) .................. 2012-067290

(51) Int. Cl.
*G03B 13/00* (2006.01)
*H04N 5/232* (2006.01)
(Continued)

(52) U.S. Cl.
CPC ................ *H04N 5/2257* (2013.01); *G02B 7/08* (2013.01); *G03B 3/04* (2013.01); *H04N 5/2253* (2013.01); *H04N 5/2254* (2013.01); *H04N 5/23212* (2013.01); *G03B 2205/0053* (2013.01)

(58) Field of Classification Search
CPC ............. G03B 3/04; G03B 2205/0053; H04N 5/2253; H04N 5/2254; H04N 5/23212; H04N 5/2257; G02B 7/08
USPC .................. 348/208.1–208.99, 373, 374, 357
See application file for complete search history.

(56) References Cited

U.S. PATENT DOCUMENTS

| | | | |
|---|---|---|---|
| 2007/0047935 A1* | 3/2007 | Awazu et al. | 396/55 |
| 2007/0092235 A1* | 4/2007 | Misawa | 396/55 |

(Continued)

FOREIGN PATENT DOCUMENTS

| | | |
|---|---|---|
| JP | 59-11071 A | 1/1984 |
| JP | 2004-212842 A | 7/2004 |

(Continued)

OTHER PUBLICATIONS

International Search Report issued Jun. 4, 2013 in PCT/JP2013/055356.

*Primary Examiner* — Chia-Wei A Chen
(74) *Attorney, Agent, or Firm* — Hazuki International, LLC (57) ABSTRACT

There is provided a camera module including: a lens; an image pickup device arranged on an optical axis of the lens; and an actuator section configured to reciprocate the image pickup device in an optical axis direction of the lens, wherein the actuator section includes a movable joint section on which the image pickup device is fixed, a parallel link mechanism section having a movable end section attached to the movable joint section and a mounting end section, and a movable element that is configured to perform displacement motion by a displacement amount depending on a level of a voltage to be applied and that is coupled to a coupling region between the movable joint section and the movable end section of the parallel link mechanism section in such a manner that the displacement motion is transmittable.

14 Claims, 10 Drawing Sheets

(51) Int. Cl.
*H04N 5/225* (2006.01)
*H04N 5/228* (2006.01)
*G03B 3/04* (2006.01)
*G02B 7/08* (2006.01)

(56) References Cited

U.S. PATENT DOCUMENTS

| | | | |
|---|---|---|---|
| 2009/0067828 A1* | 3/2009 | Ono et al. | 396/128 |
| 2010/0171392 A1* | 7/2010 | Mukae | 310/328 |
| 2011/0096419 A1* | 4/2011 | Matsuo et al. | 359/820 |
| 2011/0102606 A1* | 5/2011 | Toyomura et al. | 348/207.1 |
| 2011/0128434 A1 | 6/2011 | Hata et al. | |
| 2012/0249868 A1* | 10/2012 | Kamatani et al. | 348/374 |
| 2012/0262626 A1* | 10/2012 | Ikeda | 348/373 |
| 2012/0287318 A1* | 11/2012 | Fujinaga et al. | 348/294 |
| 2014/0055670 A1* | 2/2014 | Hongo | 348/374 |
| 2014/0160346 A1* | 6/2014 | Komada et al. | 348/373 |

FOREIGN PATENT DOCUMENTS

| | | |
|---|---|---|
| JP | 2006-91208 A | 4/2006 |
| JP | 2006-293006 A | 10/2006 |
| WO | WO 2010/103763 A1 | 9/2010 |

\* cited by examiner

FIG. 1

PRIOR ART

Macro

FIG. 4B

Inf

CAMERA MODULE AND CAMERA APPARATUS AND PARALLEL LINK MECHANISM FOR RECIPROCATING AN IMAGE PICKUP DEVICE

TECHNICAL FIELD

The present disclosure relates to a camera module and a camera apparatus that allow focusing to be performed by moving an image sensor in an optical axis direction.

BACKGROUND ART

In an autofocusing mechanism of a camera module in use for a mobile apparatus such as a mobile phone, a method of moving a lens has been typically available, and the development of a variety of actuators for activating such a lens movement has been also advanced on the premise of the lens driving.

On the other hand, in terms of the camera performance, the demand for making a lens aperture as large as possible has been created to achieve the higher sensitivity. However, reduction in size has been sought out as a module, and thus it has been difficult to meet such a demand by the use of a lens-drive actuator.

Figure 1:
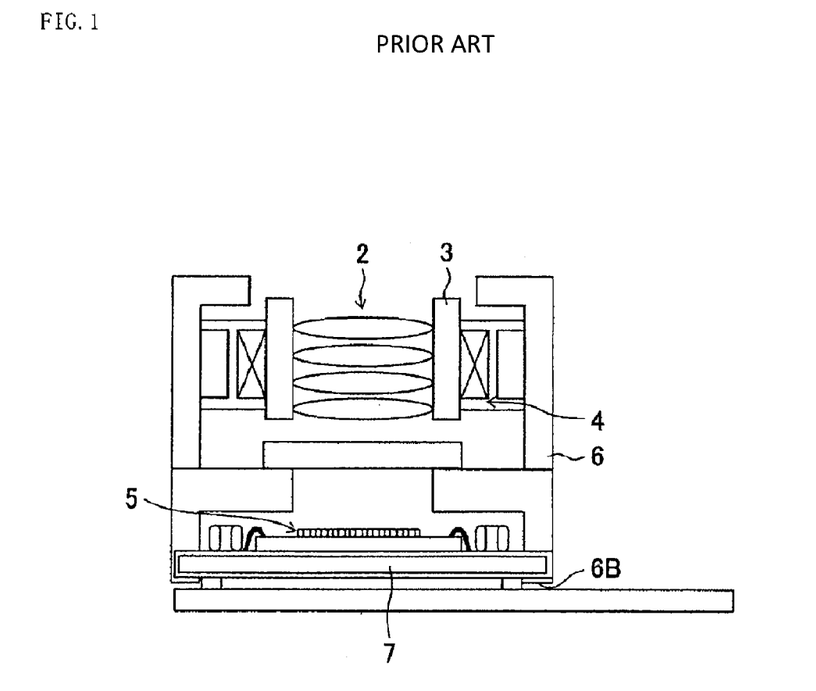
FIG. 1 is a diagram showing a small-sized camera module adopting a typical VCM (Voice Coil Motor) actuator method.

FIG. 1 is a diagram showing a small-sized camera module adopting a typical VCM (Voice Coil Motor) actuator method.

A camera module 1 illustrated in FIG. 1 has a lens system 2 that is formed of a plurality of lenses, a lens holder 3 that holds the lens system 2 with an optical axis thereof aligned, and a VCM actuator 4 including a yoke, magnet, and a coil that are all arranged on the outer circumferential side of the lens holder 3. The camera module 1 has a structure in which an image sensor 5 is attached to a substrate 7 that is arranged on a bottom surface 6B of a housing 6 of the camera module 1, and the lens system 2 is moved in the optical axis direction by the VCM actuator 4.

CITATION LIST

Patent Literature

[PTL 1] Japanese Unexamined Patent Application Publication No. S59-011071.

SUMMARY OF THE INVENTION

In the above-described structure, however, there is a limitation in size of the lens to incorporate a VCM mechanism. For example, in a camera module with a size of 8.5 mm×8.5 mm, when a typical lens-drive actuator including a VCM is used, a diameter of up to 6.5 mm is regarded as a limiting value for a size of the lens. To meet the market demand, the higher sensitivity performance has been pursued by enlarging this lens aperture up to 7 mm or 7.5 mm, but a realistic actuator that fulfills such a market demand has not yet been proposed.

A method has been also available before that moves an image sensor with a lens fixed instead of driving the lens (see Japanese Unexamined Patent Application Publication No. S59-011071 (PTL 1)). However, in a small-sized camera module that is mounted in a currently-available mobile apparatus, a space from a lens to an image sensor is small, and thus it is quite difficult physically to arrange an existing actuator in such a space for moving the image sensor.

Accordingly, it is desirable to provide a camera module and a camera apparatus that make it possible to move an image sensor, as well as to mount a large-sized lens such as a large-aperture lens and a zoom lens.

A camera module according to a first perspective of an embodiment of the present disclosure includes: a lens; an image pickup device arranged on an optical axis of the lens; and an actuator section configured to reciprocate the image pickup device in an optical axis direction of the lens, wherein the actuator section includes a movable joint section on which the image pickup device is fixed, a parallel link mechanism section having a movable end section attached to the movable joint section and a mounting end section, and a movable element that is configured to perform displacement motion by a displacement amount depending on a level of a voltage to be applied and that is coupled to a coupling region between the movable joint section and the movable end section of the parallel link mechanism section in such a manner that the displacement motion is transmittable.

A camera apparatus according to a second perspective of an embodiment of the present disclosure has a camera module that takes an object image, the camera module including: a lens; an image pickup device arranged on an optical axis of the lens; and an actuator section configured to reciprocate the image pickup device in an optical axis direction of the lens, wherein the actuator section includes a movable joint section on which the image pickup device is fixed, a parallel link mechanism section having a movable end section attached to the movable joint section and a mounting end section, and a movable element that is configured to perform displacement motion by a displacement amount depending on a level of a voltage to be applied and that is coupled to a coupling region between the movable joint section and the movable end section of the parallel link mechanism section in such a manner that the displacement motion is transmittable.

According to an embodiment of the present disclosure, it is possible to move an image sensor, as well as to mount a large-sized lens such as a large-aperture lens and a zoom lens.

EMBODIMENTS FOR CARRYING OUT THE INVENTION

Hereinafter, some embodiments of the present disclosure are described with reference to the drawings. It is to be noted that the descriptions are provided in the order given below.
1. Example of Configuration of Camera Module
2. Example of Configuration of Actuator Section
3. Example of Configuration of Camera Apparatus (1. Example of Configuration of Camera Module)

Figure 2:
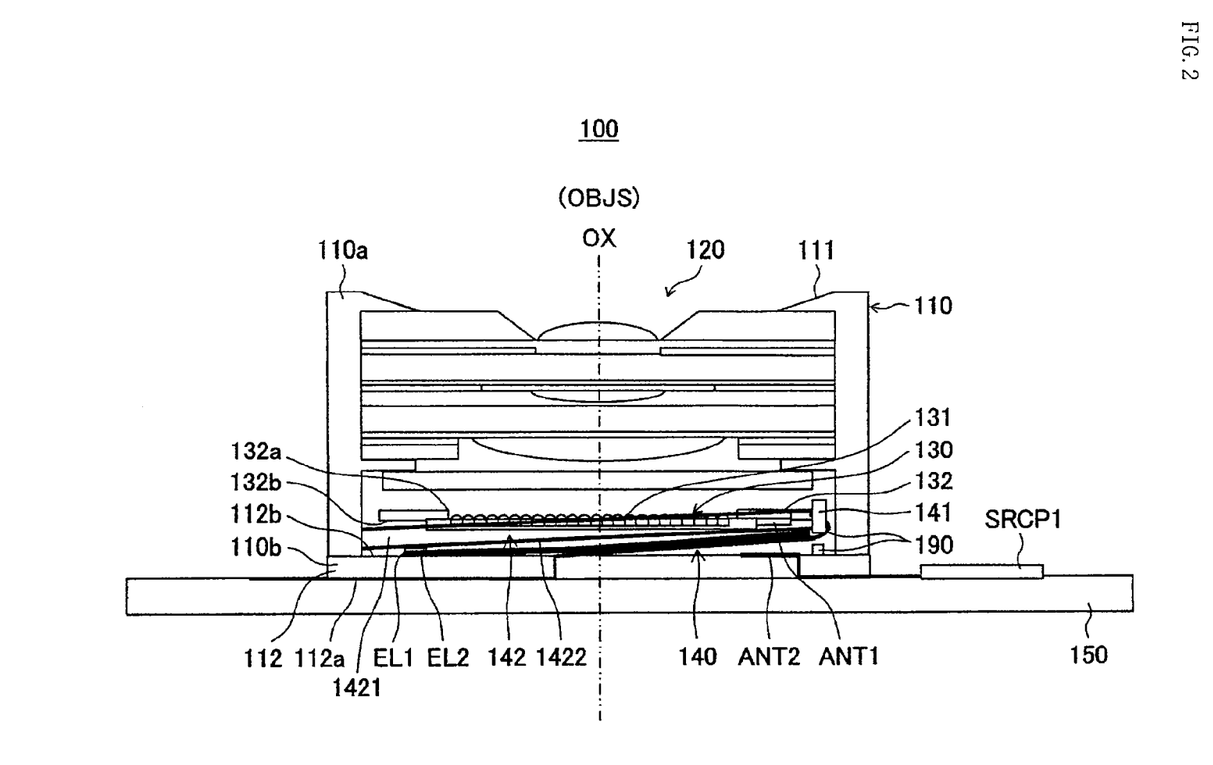
FIG. 2 is a diagram showing an example of a configuration of a camera module according to an embodiment.

FIG. 2 is a diagram showing an example of a configuration of a camera module according to an embodiment.

The camera module 100 is configured to include a housing 110, a lens 120, an image pickup device 130, and an actuator section 140.

The housing 110 is configured in a cylindrical shape in such a manner that an aperture 111 is formed on the side of one end section (first end section) 110a, and the other end section (second end section) 110b and a lateral section are blocked. In the inside of the housing 110, the lens 120 is fixed to ensure that an optical axis OX is aligned with an axis of the housing 110 across an area from the one end section (first end section) 110a on which the aperture 111 is formed to a central part. It is to be noted that the one end section (first end section) 110a on which the aperture 111 is formed is an object side OBJS to be photographed. Further, in the housing 110, the image pickup device 130 is arranged to be movable in the optical axis OX direction at a location closer to the other end section (second end section) 110b from the central part. In addition, in the housing 110, the actuator section 140 is arranged on the side of the other end section (second end section) 110b on the opposite side of a location where the lens 120 is arranged centering around the image pickup device 130.

The housing 110 is configured in such a manner that an outer surface section 112a of a bottom 112 that is the other end section (second end section) 110b is placed on a main substrate 150 on the set side (camera apparatus side) as shown in an example in FIG. 2.

The lens 120 is formed of a single optical lens or a plurality of optical lenses, and forms an object image on the object side OBJS on an imaging surface of the image pickup device 130. A circumferential part of the lens 120 is fixed to an inner wall of the housing 110. In other words, the camera module 100 according to the embodiment has a configuration that eliminates the necessity for separately providing a lens holder inside the housing 110. In another example that is not illustrated in the drawing, a structure may be adopted that makes a point of having a lens holder, and provides a male screw part at an outer circumferential portion thereof to be rotatable with respect to a housing female screw part that is not shown in the drawing. In such a structure, it is possible to finely adjust an initial position of a lens and an image sensor by rotating the lens holder.

The image pickup device 130 receives an object image on the object side OBJS that is formed by the lens 120 on an imaging surface 131, and performs photoelectric conversion of such a received image. The image pickup device 130 is formed of a solid-state image pickup device, such as a CCD and a CMOS image sensor.

The image pickup device 130 is mounted on a support substrate 132 in such a manner that the imaging surface 131 is vertical to the optical axis OX of the lens 120. In a configuration illustrated in FIG. 2, the image pickup device 130 is mounted on a substrate surface 132b on the opposite side of the side of the support substrate 132 on which the lens 120 is arranged to ensure that the imaging surface 131 is located at an aperture 132a that is formed at a central part of the support substrate 132. It is to be noted that such a structure for mounting the image pickup device 130 on the support substrate 132 is not limited to an example of the configuration illustrated in FIG. 2, and as shown in an example in FIG. 3, a configuration may be also applicable that mounts the image pickup device 130 on a substrate surface 132c on the side of the support substrate 132 on which the lens 120 is arranged.

As detailed hereinafter, the image pickup device 130 according to the embodiment is reciprocated in a predetermined range between a first position and a second position in the optical axis OX direction under movement control by the actuator section 140.

Figure 3:
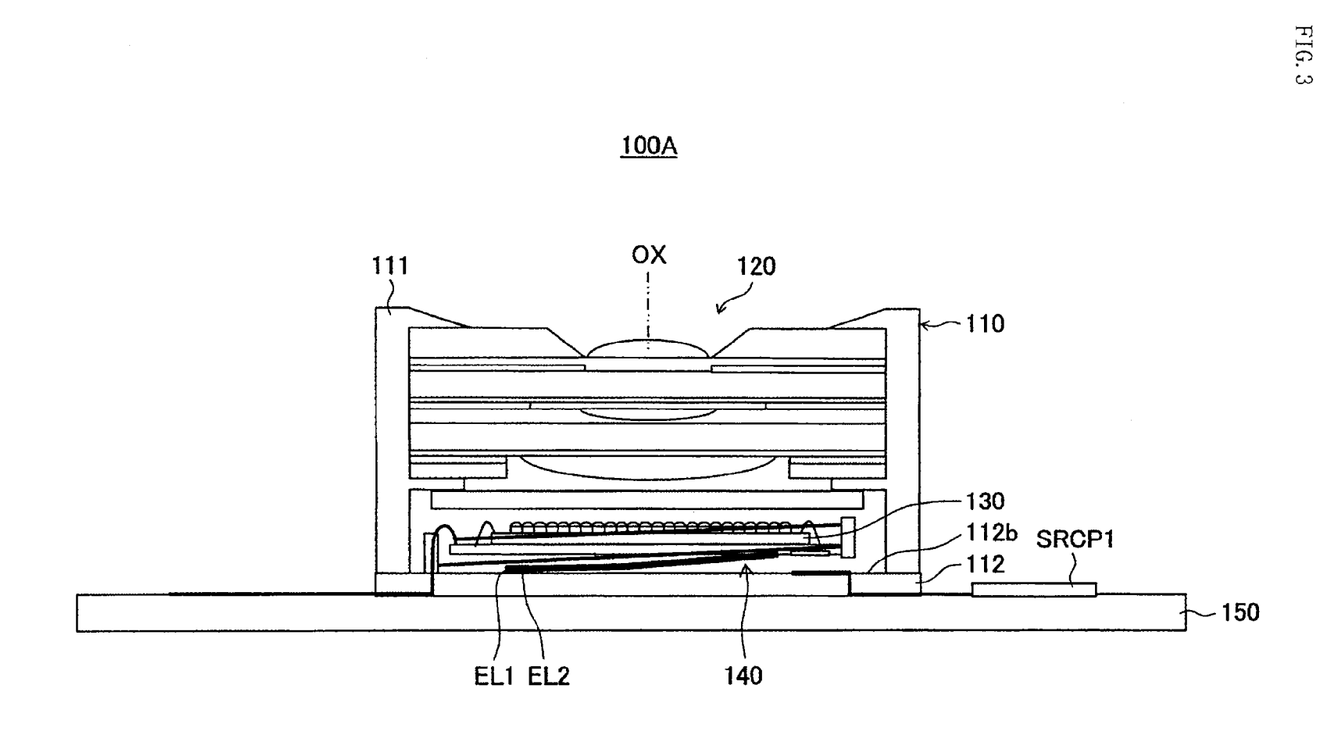
FIG. 3 is a diagram showing another example of a configuration of the camera module according to the embodiment.
Figure 4A:
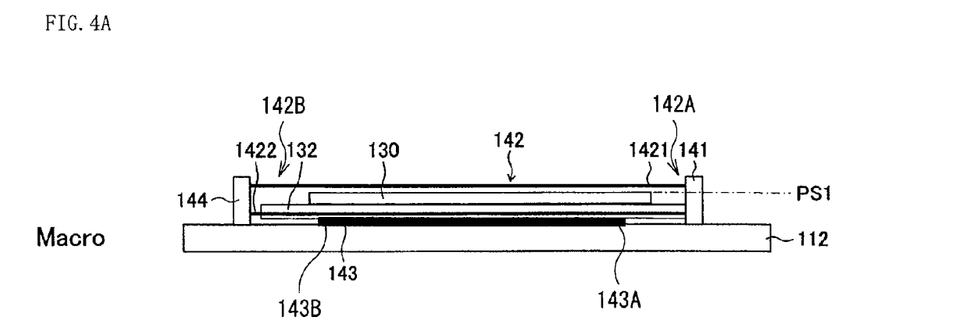
FIG. 4A is a diagram schematically showing how an image pickup device according to the embodiment is reciprocated by an actuator section, and a diagram showing a position of the image pickup device at the time of macro photographing.
Figure 4B:
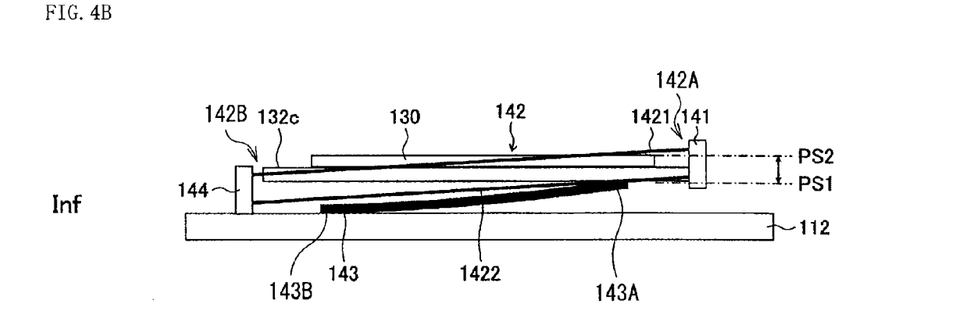
FIG. 4B is a diagram showing a position of the image pickup device in a case of infinite photographing.

Each of FIG. 4A and FIG. 4B is a diagram schematically showing how the image pickup device according to the embodiment is reciprocated by the actuator section. FIG. 4A shows a position of the image pickup device 130 at the time of so-called macro photographing, and FIG. 4B shows a position of the image pickup device 130 at the time of infinite photographing. It is to be noted that FIG. 4A and FIG. 4B are schematic diagrams utilizing a configuration illustrated in FIG. 3, however each of these drawings is basically also applicable to a configuration illustrated in FIG. 2. As shown in FIG. 4A and FIG. 4B, the image pickup device 130 according to the embodiment is reciprocated between a first position PS1 and a second position PS2 in the optical axis OX direction under movement control by the actuator section 140. Fundamentally, positional control of the image pickup device 130 is carried out linearly between the first position PS1 and the second position PS2.

It is to be noted that, in examples illustrated in FIG. 4A and FIG. 4B, the positional control is targeted at the imaging surface 131 of the image pickup device 130. However, this is only one example, and an indicative portion such as a support substrate surface may be an alternative target for the positional control.

Further, in the embodiment, a radio transmission function is built in the image pickup device 130. For example, the transmitting/receiving operation of radio signals such as millimeter-wave frequency signals may be performed between an antenna ANT1 that is formed on the support substrate 132 and an antenna ANT2 that is formed on the bottom 112 of the housing 110 of the module. A transmitting/receiving chip SRCP1 on the opposite side of the image pickup device (image sensor) 130 may be arranged on a main substrate 150 on the camera apparatus side, or may be arranged inside the module.

(2. Example of Configuration of Actuator Section)

Here, a configuration of the actuator section according to the embodiment is described in details. As described above, the actuator section 140 reciprocates the image pickup device 130 between the first position PS1 and the second position PS2 in the optical axis OX direction of the lens 120.

Figure 5A:
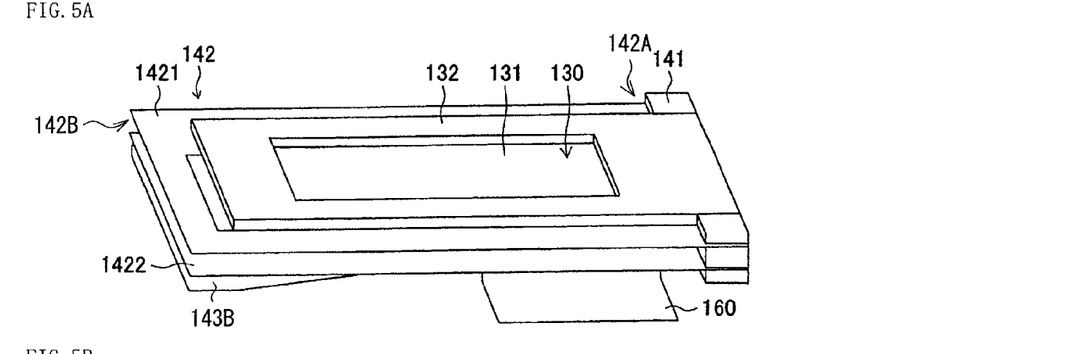
FIG. 5A is a diagram for explaining a configuration of an actuator section according to the embodiment, and a perspective diagram of the actuator section that is viewed from the top surface side of a support substrate of the image pickup device.
Figure 5B:
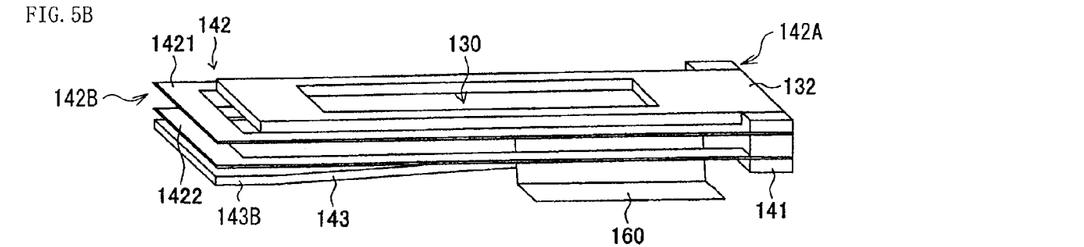
FIG. 5B is a perspective diagram of the actuator section that is viewed from the slightly upward lateral side.
Figure 5C:
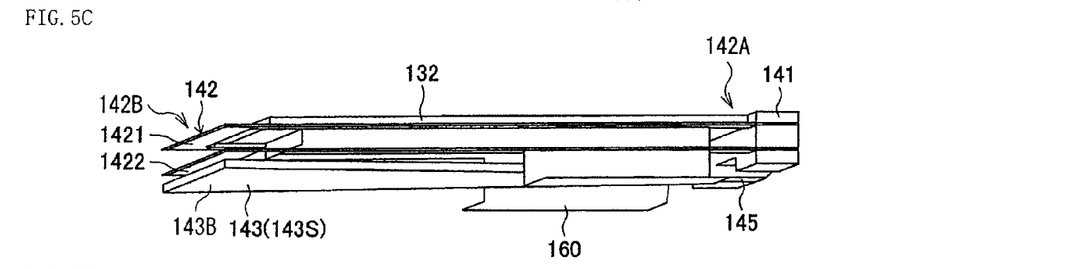
FIG. 5C is a perspective diagram of the actuator section that is viewed from the slightly downward lateral side.
Figure 5D:
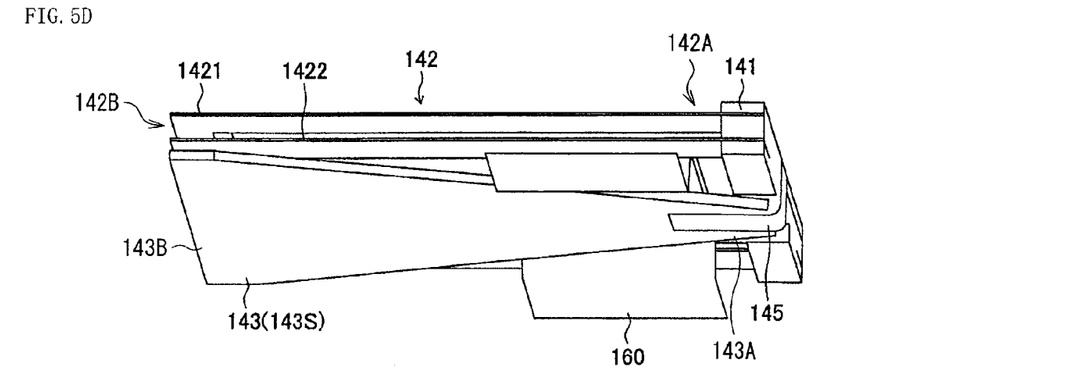
FIG. 5D is a perspective diagram of the actuator section that is viewed from the slightly downward side.

FIG. 5A to FIG. 5D are each a diagram for explaining a configuration of the actuator section according to the embodiment of the present disclosure. FIG. 5A shows a perspective diagram of the actuator section 140 that is viewed from the top surface side of the support substrate 132 of the image pickup device 130. FIG. 5B shows a perspective diagram of the actuator section 140 that is viewed from the slightly upward lateral side. FIG. 5C shows a perspective diagram of the actuator section 140 that is viewed from the slightly downward lateral side. FIG. 5D shows a perspective diagram of the actuator section 140 that is viewed from the slightly downward side. Each of FIG. 5A to FIG. 5D illustrates as an example a structure for mounting the image pickup device as shown in FIG. 2, however a configuration of the actuator section is the same also in a case of a mounting structure illustrated in each of FIG. 4A and FIG. 4B.

The actuator section 140 is configured to include a movable joint section 141, a parallel link mechanism section 142, and a movable element 143.

The movable joint section 141 is arranged to be movable in the optical axis OX direction under movement control by the actuator section 140 with one end section of the image pickup device 130 fixed, that is, with one end section of the support substrate 132 fixed in this example.

The parallel link mechanism section 142 has a function of holding the image pickup device 130 at a target position linked with the movement of the movable joint section 141 with one end section (movable end section: a right end side in an example in the drawing) 142A attached to the movable joint section 141, and with the other end section (mounting end section: a left end side in an example in the drawing) 142B fixed.

As shown in FIG. 2, FIG. 3, FIG. 4A, FIG. 4B, and FIG. 5A to FIG. 5D, the parallel link mechanism section 142 is formed of two plate springs 1421 and 1422 that are arranged in parallel at spacing intervals in opposition to each other, and are outlined as it is called by eliminating central parts thereof. One end section each of the two plate springs 1421 and 1422 is attached to the movable joint section 141 on the one end section (movable end section) 142A of the parallel link mechanism section 142, and the other end section each of the two plate springs 1421 and 1422 is fixed on the opposite side (on the side of the second end section 110b) centering around the image pickup device 130 in the housing 110 on the other end section (mounting end section) 142B of the parallel link mechanism section 142. On the other end section (mounting end section) 142B of the parallel link mechanism section 142, the other end section each of the two plate springs 1421 and 1422 is fixed to a region close to the bottom 112 of an inner wall of the housing 110 in examples illustrated in FIG. 2 and FIG. 5A to FIG. 5D. It is to be noted that, on the other end section (mounting end section) 142B of the parallel link mechanism section 142, it is also possible to configure the other end section each of the two plate springs 1421 and 1422 in a manner of being fixed to a fixed joint section 144 that is fixed to the bottom 112 of the housing 110, as shown in FIG. 3, FIG. 4A and FIG. 4B.

For the movable element 143, one end section (coupling end section) 143A thereof is coupled to a coupling region section BND between the movable joint section 141 and the one end section (movable end section) 142A of the parallel link mechanism section 142 in such a manner that the displacement motion is transmittable. In the embodiment, the one end section (coupling end section) 143A of the movable element 143 is attached to the movable joint section 141 via a power supply wiring flexible cable 145. The movable element 143 is displaced by a displacement amount depending on a level of a drive voltage DRV to be applied to electrodes, and reciprocates the image pickup device 130 between the first position PS1 and the second position PS2 in the optical axis direction. The other end section (fixed end section) 143B of the movable element 143 is fixed to an inner surface 112b on the bottom 112 of the housing 110 together with electrodes EL1 and EL2 for applying voltages.

As described above, in the actuator section 140, the movable joint section 141 is arranged on the lateral side of the image pickup device 130 and the support substrate 132, and the parallel link mechanism section 142 is arranged on the side of the other end section (on the side of the second end section 110b) on the opposite side centering around the image pickup device 130 in the optical axis OX direction. In addition, the movable element 143 is arranged on the side of the other end section (on the bottom side, that is, on the side of the second end section 110b) further from the parallel link mechanism section 142.

The movable element 143 is formed of a sheet-like EAP (Electro-Active Polymer) sheet 143S. As described hereinafter as a polymer actuator, the EAP sheet 143S has a structure in which ion-exchange resin is interposed between electrode layers. This EAP sheet 143S is a thin sheet with a thickness of about 0.1 mm, but has a property of being curved by applying a voltage across both surfaces. It is possible to achieve an actuator in a quite small space by using this curvature as a thrust force for moving the image pickup device 130. For example, as shown in FIG. 5D, the EAP sheet 143S according to the embodiment is formed in such a manner that the other end section (fixed end section) 143B side on the electrode side is larger in width, and one end section (coupling end section) 143A is smaller in width. More specifically, the EAP sheet 143S takes a shape of a trapezoid or a triangle in which the electrode side (fixed end section 143B side) is larger in width, and the opposite side (coupling end section 143A side) is smaller in width, and has a configuration of reducing the area while maintaining a thrust force of the EAP.

Further, in the actuator section 140, at a region where the actuator section 140 is arranged, a bridge connection is made using a high thermal conductor sheet 160 having a heat dissipation function that is formed of graphite and the like between the image pickup device 130 and the other end section (the bottom, that is, the second end section 110b) of the housing 110. More specifically, as shown in FIG. 5A to FIG. 5D, the high thermal conductor sheet 160 is arranged in contact with or in proximity to the image pickup device 130 (support substrate 132) through the outlined portion of the plate springs 1421 and 1422, and is extended from the side section of the EAP sheet 143S with the lateral side thereof folded back. It is to be noted that this high thermal conductor sheet 160 is commonly used for power supply grounding wiring of the image pickup device 130.

In the embodiment, the EAP sheet 143S that is served as the movable section 143 is formed of a polymer actuator that is a rod-like or sheet-like movable element.

The polymer actuator includes an ion-conductive polymer film impregnated with cationic materials, and an electrode film that is provided on each of both sides of the ion-conductive polymer film, wherein the ion-conductive polymer film is bent (curved) or transformed by applying a voltage across the electrode films.

As described previously, for the polymer actuator, one end section (coupling end section) 143A thereof is coupled to a coupling region section between the movable joint section 141 and the parallel link mechanism section 142 in such a manner that the displacement motion is transmittable. The other end section (fixed end section) 143B of the polymer actuator is fixed to the bottom 112 of the housing 110 together with the electrodes EL1 and EL2. For example, by applying a drive voltage DRV to the electrodes EL1 and EL2, the polymer actuator may be bent (curved), thereby reciprocating the image pickup device 130 in the optical axis OX direction to achieve an autofocusing mechanism.

Figure 6:
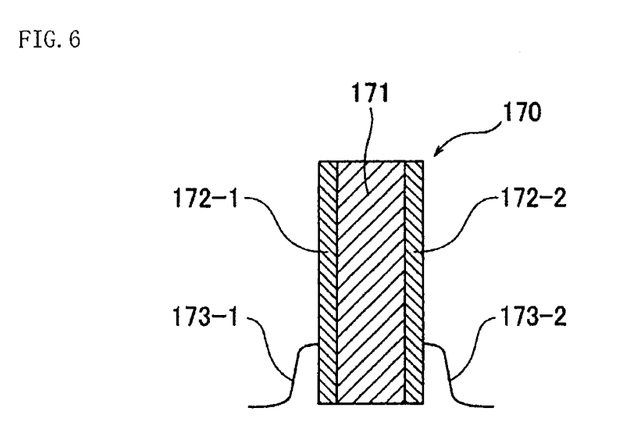
FIG. 6 is a cross-sectional view showing an example of a configuration of a polymer actuator that is served as an EAP sheet according to the embodiment.

Hereinafter, the description is provided on a configuration of the polymer actuator that is served as the EAP sheet according to the embodiment. FIG. 6 is a cross-sectional view showing an example of a configuration of the polymer actuator that is served as the EAP sheet according to the embodiment.

As shown in FIG. 6, a polymer actuator 170 has an ion-conductive polymer film 171 impregnated with cationic materials, and electrode films 172-1 and 172-2 that are provided on each of both sides of the ion-conductive polymer film 171. The polymer actuator 170 has lead wires 173-1 and 173-2 each of which is connected with the electrode films 172-1 and 172-2, respectively. In the polymer actuator 170, the ion-conductive polymer film 171 is bent (curved) or transformed by applying a voltage across the electrode films 172-1 and 172-2 through a pair of the lead wires 173-1 and 173-2.

The ion-conductive polymer film 171 is configured of ion-exchange resin forming a skeleton using fluororesin, hydrocarbon system, and the like, and takes a shape having two principal surfaces of front and rear sides. Examples of the shape may include a reed shape, a disc shape, a columnar shape, a cylindrical form, and the like. Further, as the ion-exchange resin, either of anion-exchange resin, cation-exchange resin, or amphoteric ion-exchange resin may be acceptable. However, the use of the cation-exchange resin may be preferable.

An example of the cation-exchange resin may include a material in which a functional group such as a sulfonate group or a carboxyl group is introduced into polyethylene, polystyrene, fluororesin, and the like, and in particular the cation-exchange resin in which the functional group such as a sulfonate group or a carboxyl group is introduced into the fluororesin may be preferable.

The electrode films 172 (172-1 and 172-2) are configured of carbon powder and ion-conductive resin, and are characterized in that the carbon powder is bound together via the ion-conductive resin. The carbon powder is fine-grained powder of carbon black having conductivity, and the carbon powder with the larger specific surface area has the larger surface area that comes in contact with the ion-conductive polymer film 171 as the electrode films 172, thus allowing the larger transformation amount to be obtained. For example, Ketjen black may be preferable. Further, the ion-conductive resin may be the same as a constituent material for the ion-conductive polymer film 171.

Further, the electrode films 172 (172-1 and 172-2) are formed in such a manner that a coating material containing the ion-conductive resin component and the carbon powder is coated on the ion-conductive polymer film 171. Alternatively, the electrode films 172 (172-1 and 172-2) are formed in such a manner that a conductive film that is configured of the carbon powder and the ion-conductive resin is press-bonded to the ion-conductive polymer film 171. In either method, it is possible to form the electrode films 172 briefly and in a short time.

It is to be noted that the ion-conductive polymer film 171 is at least impregnated with cationic materials, and the cationic materials may be preferably any one of water and metallic ion, water and organic ion, or ionic liquid. Here, examples of the metallic ion may include sodium ion, potassium ion, lithium ion, magnesium ion, and the like. Further, examples of the organic ion may include alkylammonium ion and the like. These ions are present as hydrates in the ion-conductive polymer film 171. When the ion-conductive polymer film 171 is put in a moisture state including water and metallic ion, or water and organic ion, the polymer actuator 170 may be preferably sealed to prevent such water from being volatilized from the inside.

Further, the ionic liquid is a solvent composed of only non-combustible and non-volatile ion that is also called ordinary temperature molten salt, and for example, imidazolium ring-based compound, pyridinium ring-based compound, or aliphatic-based compound may be usable. When the ion-conductive polymer film 171 is impregnated with the ionic liquid, it is possible to use the polymer actuator 170 even at high temperature or in vacuum without worrying about volatilization.

The operating principle of the polymer actuator 170 according to the embodiment is shown in FIG. 7A to FIG. 7C and FIG. 8A to FIG. 8C. Here, the description is provided with the assumption that sodium ion is impregnated in the ion-conductive polymer film 1751.

Figure 7A:
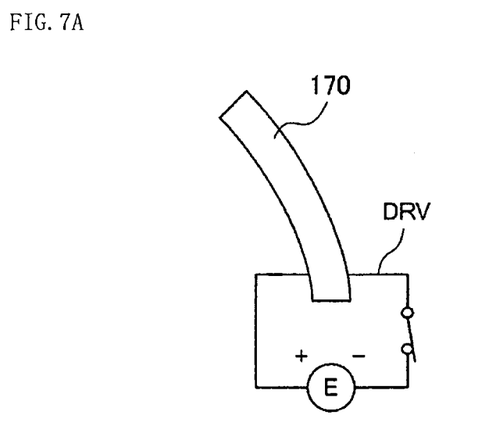
FIG. 7A is a first diagram for explaining the operating principle of the polymer actuator according to the embodiment, and a diagram showing a case where a positive potential is applied to a left-side electrode film and a negative potential is applied to a right-side electrode film.
Figure 8A:
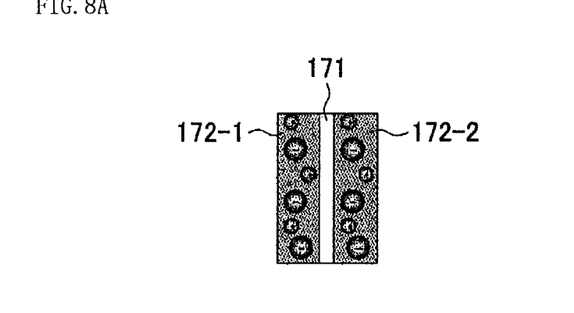
FIG. 8A is a second diagram for explaining the operating principle of the polymer actuator according to the embodiment, and a diagram showing a case where there is no potential difference between two electrode films.
Figure 8B:
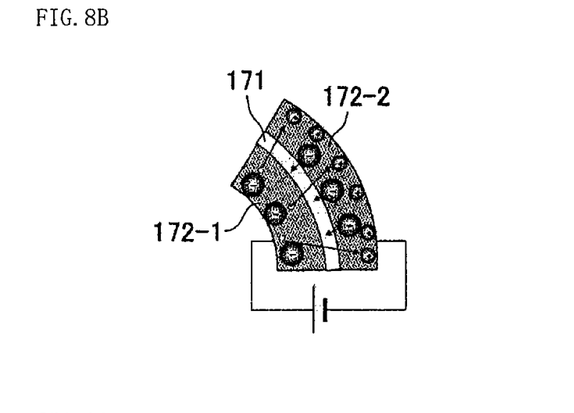
FIG. 8B is a diagram showing a case where a positive potential is applied to a left-side electrode film and a negative potential is applied to a right-side electrode film.

In FIG. 7A and FIG. 8B, a positive potential is applied to the electrode film 172-1 of the polymer actuator 170 on the left side in each of the drawings, and a negative potential is applied to the electrode film 172-2 on the right side in each of the drawings from a power supply E through the lead wires 173-1 and 173-2, respectively. With such a potential difference, in the ion-conductive polymer film 171 of the polymer actuator 170, sodium ion hydrates are attracted and moved toward the electrode film 172-2 on the side (the right sides in the drawings) to which the negative potential is applied. This concentrates the sodium ion hydrates on the vicinity of the electrode film 172-2, leading to volume expansion of this region. On the other hand, sodium ion hydrates in the proximity to the electrode film 172-1 on the side (the left sides in the drawings) to which the positive potential is applied decrease in concentration, leading to volume contraction of this region. As a result, a volume difference occurs between regions in the proximity to the two electrode films 172-1 and 172-2 of the ion-conductive polymer film 171, causing the ion-conductive polymer film 151 to be curved toward the left side in each of the drawings. In this case, for example, the image pickup device 130 may move in the optical axis OX direction heading toward the second position PS2.

Figure 7B:
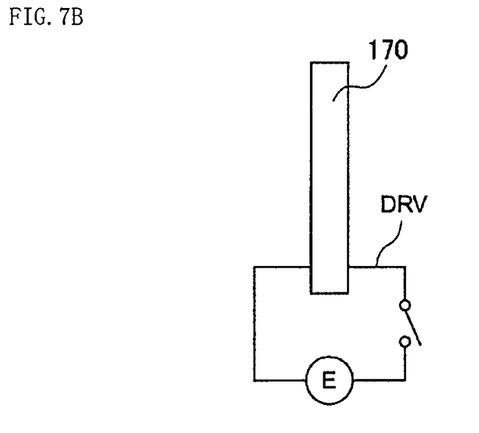
FIG. 7B is a diagram showing a case where there is no potential difference between two electrode films.

In FIG. 7B and FIG. 8A, no voltage is applied from the power supply E, and thus there is no potential difference between the two electrode films 172-1 and 172-2. As a result, there is no volume difference between the regions in the proximity to the two electrode films 172-1 and 172-2 of the ion-conductive polymer film 171, causing the ion-conductive polymer film 171 to remain in a straight state without being curved. In this case, the image pickup device 130 is held in a stable position as it is. Alternatively, the image pickup device 130 returns from the first position PS1 or the second position PS2 to the stable position.

Figure 7C:
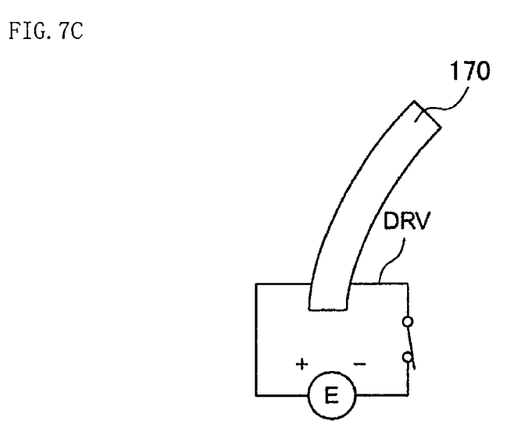
FIG. 7C is a diagram showing a case where a negative potential is applied to a left-side electrode film and a positive potential is applied to a right-side electrode film.
Figure 8C:
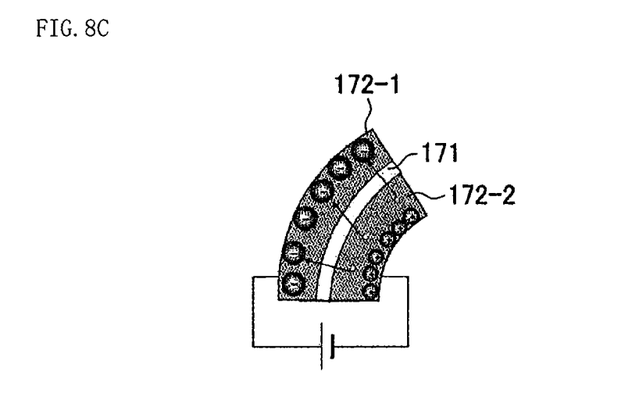
FIG. 8C is a diagram showing a case where a negative potential is applied to a left-side electrode film and a positive potential is applied to a right-side electrode film.

In FIG. 7C and FIG. 8C, a negative potential is applied to the electrode film 172-1 of the polymer actuator 170 on the left side in each of the drawings, and a positive potential is applied to the electrode film 172-2 on the right side in each of the drawings from the power supply E through the lead wires 173-1 and 173-2, respectively. In other words, a method of applying voltages is reverse to that in a case of FIG. 7A and FIG. 8B. With such a potential difference, in the ion-conductive polymer film 171 of the polymer actuator 170, a region in the proximity to the electrode film 172-1 on the side (the left sides in the drawings) to which the negative potential is applied expands in volume. On the other hand, a region in the proximity to the electrode film 172-2 on the side (the right sides in the drawings) to which the positive potential is applied contracts in volume. As a result, the ion-conductive polymer film 171 is curved toward the right side in each of the drawings. In this case, for example, the image pickup device 130 may move in the optical axis OX direction heading toward the first position PS1.

It is possible to control the transformation performance (transformation amount and/or transformation speed) of this polymer actuator 170 by adjusting at least one of the specific surface area of the carbon powder, a solid content ratio by weight of the carbon powder to the ion-conductive resin, and thicknesses of two electrode films 152. As an alternative, it is also possible to control the transformation performance (transformation amount and/or transformation speed) of this polymer actuator 170 by adjusting a ratio in thickness of the electrode film 172 to the ion-conductive polymer film 171.

Figure 9:
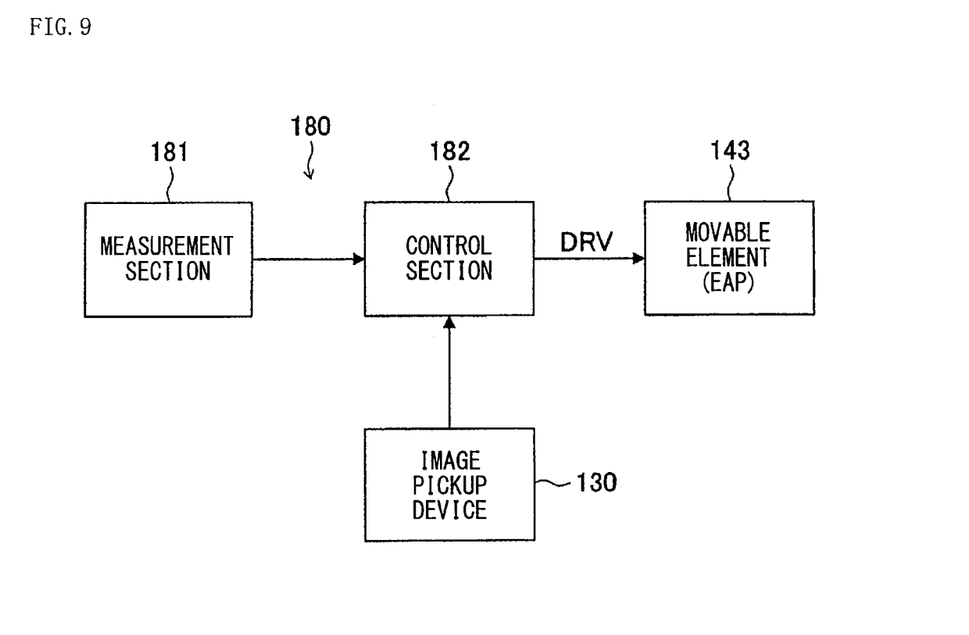
FIG. 9 is a block diagram showing an example of a basic configuration of a drive control system that applies a drive voltage to electrodes of a movable element according to the embodiment.

It is to be noted that the drive voltage DRV to be applied to electrodes of the movable element 143 having the above-described configuration is applied by a drive control system. FIG. 9 is a block diagram showing an example of a basic configuration of a drive control system that applies the drive voltage to electrodes of the movable element 143 according to the embodiment.

A control system 180 illustrated in FIG. 9 has a measurement section 181 and a control section 182. The measurement section 181 measures a distance between the image pickup device 130 and the other end section (second end section) 110b, for example, the bottom 112 of the housing 110. The control section 182 uses moving distance information that is obtained by the measurement section 181 and signal information that is provided by the image pickup device 130 to perform a focusing control of an object by giving a feedback to a voltage to be applied to the movable element 143.

In the configuration as mentioned above, if a voltage is applied to the movable element (EAP sheet) 143, bending of the EAP depending on a magnitude of the voltage pushes up or down on the image pickup device 130. At this time, the image pickup device 130 is capable of moving in a quite parallel manner because the parallel link mechanism section 142 that is configured of the plate springs 1421 and 1422, or the like is formed. In actual object-focusing operation, the voltage DRV to be applied to the movable element 143 is set up properly on the basis of information from a position detecting sensor (FIG. 2) such as a photo-reflector that is arranged on the support substrate 132 and the like, and an image signal from the image pickup device 130. As a result, the image pickup device 130 moves to a desired position to reach a focusing-enabled position.

In the embodiment, the following points are further contrived in an actual specific structure. The movable element (EAP sheet) 143 is typically applied with a voltage within 1 V between the electrode layers on both sides. However, to increase the movement amount of the image pickup device 130, that is, to increase a deflection width of bending of the movable element (EAP sheet) 143, it is more advantageous to use a positive voltage and a negative voltage. For example, if a voltage of +/−1 V is applied to the EAP having a deflection width of 0.2 mm at 1 V, the EAP is bent toward positive and reverse directions, and thus it is possible to obtain a deflection width of 0.4 mm in total. However, when this is applied to the camera module 100 according to the embodiment, it may be preferable that the other end section (fixed end section) 143B of the movable element (EAP sheet) 143 be preliminarily suspended by 0.2 mm from the bottom of the module housing 110. This is disadvantageous in achieving the low-profile module.

Figure 10:
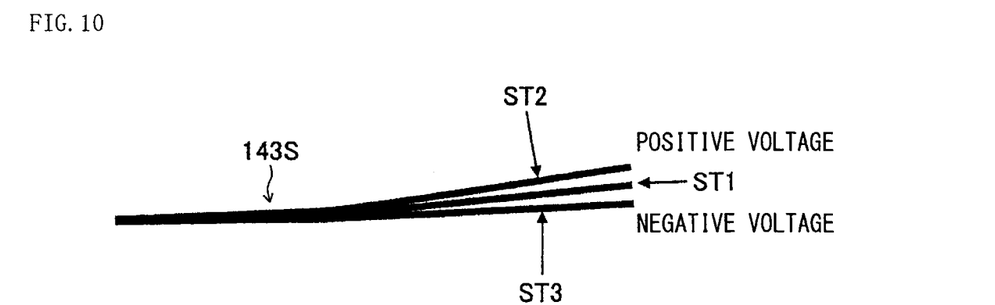
FIG. 10 is a diagram for explaining an example of a preferred arrangement of the movable element (EAP sheet) according to the embodiment.

Accordingly, as shown in FIG. 10, the movable element (EAP sheet) 143 is preliminarily formed to be subject to warpage. This is a shape to be obtained if the EAP is forcibly bent with a proper curvature, and a predetermined high-temperature treatment is carried out for the EAP. As a result, even if an applied voltage is zero, the movable element (EAP sheet) 143 has already had a displacement of 0.2 mm (a state ST1 in FIG. 10). Further, when a positive voltage is applied (a state ST2 in FIG. 10), and when a negative voltage is applied (a state ST3 in FIG. 10), it is possible to obtain deflection widths of +0.2 mm and −0.2 mm, respectively, that is, a deflection width of 0.4 mm in total. When a voltage of −1 V is applied, the movable element (EAP sheet) 143 takes a shape of being flatly stuck to the inner surface (bottom surface) 112b on the bottom 112 of the module housing 110. This is quite advantageous in achieving the low-profile module.

In such a manner, in the embodiment, the movable element (EAP sheet) 143 is formed to include physical warpage preliminarily. Even if an applied voltage is zero, one end section of the movable element (EAP sheet) 143 is located at a suspending position away from the other end section of the housing 110 (the state ST1 in FIG. 10), and it is also possible to make an arrangement in such a manner that the movable element (EAP sheet) 143 is displaced bidirectionally with the suspending position (the state ST1 in FIG. 10) as a midpoint of reciprocating motion when a positive voltage is applied and when a negative voltage is applied.

Further, as an adverse effect that is raised by suspending the image pickup device (image sensor) in the air, a heat dissipation process is difficult to be performed. In the currently-available image pickup device, power consumption has risen with an increase in the number of pixels and associated drive frequencies, and thus how to dissipate the heat generated by the image pickup device has presented an issue to solve. In a typical lens-drive AF, it is possible to dissipate the heat to the bottom surface side of a module through a substrate on which the image pickup device is mounted. However, in a state where the image pickup device is suspended in the air like the embodiment, it is likely that the heat dissipation will be suppressed. As countermeasures against such an issue, in the embodiment, as shown in FIG. 5D, the high thermal conductor sheet 160 such as a graphite sheet is connected between the image pickup device 130 and the inner surface (bottom surface) 112b on the bottom 112 of the module housing 110. Since the graphite sheet to be used here has a thickness of only a few dozens of microns, it does not disturb the motion of the image pickup device 130, and allows the heat generated by the image pickup device 130 to be efficiently dissipated to the bottom surface side of the module.

As described thus far, according to the embodiment, it is possible to achieve the following effects. In a small-sized camera module, it is possible to achieve an AF actuator adopting an image sensor drive method that has been difficult to be realized in an existing AF actuator. Accordingly, a camera module is not subject to the restriction of lens shape and weight. For example, it is simple to even attach a lens with a diameter of 8 mm to a module with a size of 8.5 mm×8.5 mm, and it is possible to simply enhance the sensitivity by the use of a high-brightness lens. Further, heavy-weight lenses such as a glass lens and a zoom lens are also mountable without worrying about a thrust force of an actuator. In addition, for the future, with the development of a wafer-level manufacturing method, a rectangular lens will be also available instead of a typical round lens, and such a lens in the shape unsuitable for rotation is also mountable successfully. A lens barrel for integrating a plurality of lenses is unnecessary, which is advantageous in terms of costs as well as in reducing size in a module shape. Moreover, a thrust force for moving a light-weight image sensor is sufficient to be significantly lower than an existing thrust force, which is advantageous in reducing power consumption. In a rough estimation for a quite typical module as an example, a calculation result is that a weight of a target to be moved in a case of moving an image sensor is about one-half of a weight in a case of moving a lens, and an energy consumption is also one-half. There is also an advantage in a product planning. In a single-lens reflex camera, an interchangeable lens is typically available. However, in a mobile apparatus as well, it is possible to establish a new concept that a customer interchanges lenses.

A camera module having such effects is applicable as a camera module (module including an optical system and an image pickup device) for a digital camera and the like that are mounted in a mobile phone and other apparatuses.

(3. Example of Configuration of Camera Apparatus)

Figure 11:
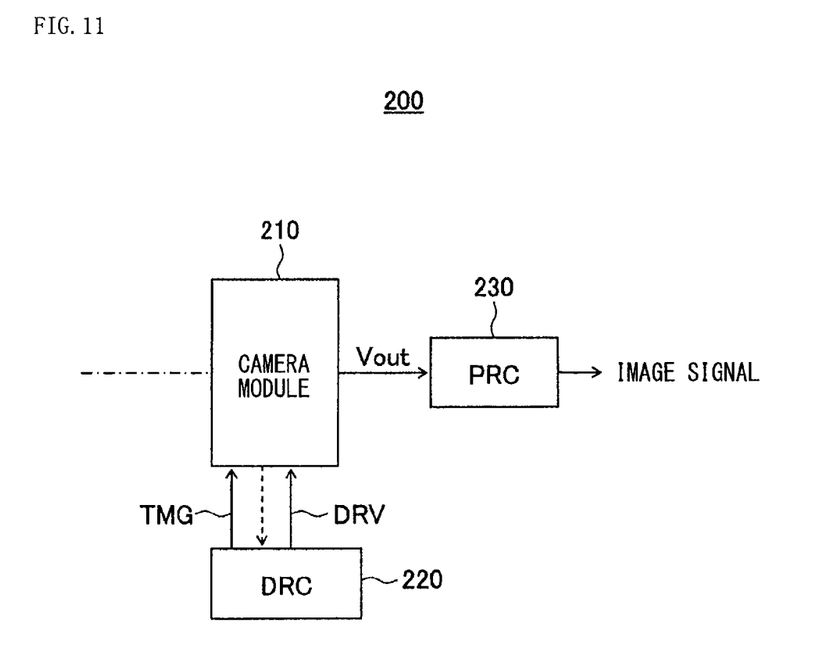
FIG. 11 is a diagram showing an example of a configuration of a camera apparatus to which the camera module according to the embodiment of the present disclosure is applicable.

FIG. 11 is a diagram showing an example of a configuration of a camera apparatus to which the camera module according to the embodiment is applicable.

As shown in FIG. 11, this camera apparatus 200 has a camera module 210 that allows incident light (image light) to form an image on an imaging surface of an image pickup device, for example, as an optical system that guides the incident light to a pixel region (forms an object image). As the camera module 210, camera modules 100 and 100A according to the embodiment are applicable. Further, the camera apparatus 200 has a driving circuit (DRC) 220 that drives an actuator section of the camera module 210, and a signal processing circuit (PRC) 230 that processes an output signal from an image pickup device on the camera module 210.

The driving circuit 220 corresponds to the drive control system in FIG. 9, and generates the drive voltage DRV for performing a drive control that allows the image pickup device to be reciprocated in the optical axis direction by the use of the actuator section of the camera module 210 to provide the resulting drive voltage DRV to the actuator section. The driving circuit 220 has a timing generator (not shown in the drawing) that generates various timing signals including a start pulse and a clock pulse for driving circuits in the camera module 210, and drives the camera module 210 using a predetermined timing signal TMG.

Further, the signal processing circuit 230 carries out a predetermined signal processing operation for an output signal of the camera module 210. An image signal that is processed by the signal processing circuit 230 is recorded on a recording medium such as a memory, for example. Image information recorded on the recording medium is hard-copied by a printer and the like. Further, the image signal that is processed by the signal processing circuit 230 is displayed as a moving image on a monitor that is configured of a liquid crystal display and the like.

As described above, in an image pickup apparatus such as a digital still camera, by mounting the camera module described previously as the camera module 321, it is possible to achieve a camera that is highly resistant to shock from the outside, and has low possibility of aging deterioration, as well as exhibits high accuracy.

It is to be noted that the present technology may have the following configurations.

(1) A camera module, including:
a lens;
an image pickup device arranged on an optical axis of the lens; and
an actuator section configured to reciprocate the image pickup device in an optical axis direction of the lens,
wherein the actuator section includes
a movable joint section on which the image pickup device is fixed,
a parallel link mechanism section having a movable end section attached to the movable joint section and a mounting end section, and
a movable element that is configured to perform displacement motion by a displacement amount depending on a level of a voltage to be applied and that is coupled to a coupling region between the movable joint section and the movable end section of the parallel link mechanism section in such a manner that the displacement motion is transmittable.

(2) The camera module according to (1), further including a housing having a first end section and a second end section, wherein
the lens is arranged on a side of the first end section of the housing, and
the image pickup device and the actuator section are arranged on a side of the second end section of the housing.

(3) The camera module according to (2), wherein the parallel link mechanism section is configured of two plate springs arranged at spacing intervals in opposition to each other, and one end section each of the two plate springs is attached to the movable joint section in the movable end section, and the other end section each of the two plate springs is fixed to the second end section of the housing in the mounting end section.

(4) The camera module according to (2) or (3), wherein the actuator section further has an electrode configured to apply the voltage to the movable element, and
the movable element has a fixed end section that is fixed to the second end section of the housing together with the electrode, and a coupling end section that is coupled to the coupling region.

(5) The camera module according to (4), wherein the movable element is configured of a sheet-like EAP (Electro-Active Polymer) sheet, and
the EAP sheet is large in width on a side of the fixed end section, and is small in width on a side of the coupling end section.

(6) The camera module according to (5), wherein the EAP sheet includes a physical warpage, and when an applied voltage is zero, the coupling end section is located at a suspending position away from the second end section of the housing, and the EAP sheet is displaceable bidirectionally with the suspending position as a midpoint of reciprocating motion when a positive voltage is applied and when a negative voltage is applied.

(7) The camera module according to any one of (2) to (6), wherein a bridge connection is made with a high thermal conductor sheet having a heat dissipating function between the image pickup device and the second end section of the housing.

(8) The camera module according to (7), wherein the high thermal conductor sheet is used commonly as power supply grounding wiring for the image pickup device.

(9) The camera module according to any one of (2) to (8), further including:
a measurement section configured to measure a distance between the image pickup device and the second end section of the housing; and
a control section configured to use moving distance information obtained by the measurement section and signal information provided by the image pickup device to perform a focusing control of an object by giving a feedback to the voltage to be applied to the movable element.

(10) The camera module according to any one of (1) to (9), wherein the image pickup device has a radio transmission function configured to transmit information obtained by taking an image wirelessly.

(11) The camera module according to any one of (1) to (10), wherein the image pickup device is mounted on a support substrate, and a part of the support substrate is fixed to the movable joint section.

(12) A camera apparatus having a camera module configured to take an object image, the camera module including:
a lens;
an image pickup device arranged on an optical axis of the lens; and
an actuator section configured to reciprocate the image pickup device in an optical axis direction of the lens,
wherein the actuator section includes
a movable joint section on which the image pickup device is fixed,
a parallel link mechanism section having a movable end section attached to the movable joint section and a mounting end section, and
a movable element that is configured to perform displacement motion by a displacement amount depending on a level of a voltage to be applied and that is coupled to a coupling region between the movable joint section and the movable end section of the parallel link mechanism section in such a manner that the displacement motion is transmittable.

(13) The camera apparatus according to (12), further including a housing having a first end section and a second end section, wherein
the lens is arranged on a side of the first end section of the housing, and
the image pickup device and the actuator section are arranged on a side of the second end section of the housing.

(14) The camera apparatus according to (13), further including:
a driving section configured to perform a drive control of the camera module; and
a signal processing section configured to process a signal from the camera module,
wherein the driving section includes
a measurement section configured to measure a distance between the image pickup device and the second end section of the housing, and
a control section configured to use moving distance information obtained by the measurement section and signal information provided by the image pickup device to perform a focusing control of an object by giving a feedback to the voltage to be applied to the movable element.

This application claims the priority on the basis of Japanese Patent Application No. 2012-067290 filed on Mar. 23, 2012 in Japan Patent Office, the entire contents of which are incorporated in this application by reference.

Those skilled in the art could assume various modifications, combinations, subcombinations, and changes in accordance with design requirements and other contributing factors. However, it is understood that they are included within a scope of the attached claims or the equivalents thereof.

The invention claimed is:

1. A camera module, comprising:
a lens;
an image pickup device arranged on an optical axis of the lens; and
an actuator section configured to reciprocate the image pickup device in an optical axis direction of the lens,
wherein the actuator section includes
a movable joint section on which the image pickup device is fixed,
a parallel link mechanism section having a movable end section attached to the movable joint section and a mounting end section, and
a movable element that is configured to perform displacement motion by a displacement amount depending on a level of a voltage to be applied and that is coupled to a coupling region between the movable joint section and the movable end section of the parallel link mechanism section in such a manner that the displacement motion is transmittable.

2. The camera module according to claim 1, further comprising a housing having a first end section and a second end section, wherein
the lens is arranged on a side of the first end section of the housing, and
the image pickup device and the actuator section are arranged on a side of the second end section of the housing.

3. The camera module according to claim 2, wherein the parallel link mechanism section is configured of two plate springs arranged at spacing intervals in opposition to each other, and one end section each of the two plate springs is attached to the movable joint section in the movable end section, and the other end section each of the two plate springs is fixed to the second end section of the housing in the mounting end section.

4. The camera module according to claim 2, wherein the actuator section further has an electrode configured to apply the voltage to the movable element, and
the movable element has a fixed end section that is fixed to the second end section of the housing together with the electrode, and a coupling end section that is coupled to the coupling region.

5. The camera module according to claim 4, wherein the movable element is configured of a sheet-like EAP (Electro-Active Polymer) sheet, and
the EAP sheet is large in width on a side of the fixed end section, and is small in width on a side of the coupling end section.

6. The camera module according to claim 5, wherein the EAP sheet includes a physical warpage, and when an applied voltage is zero, the coupling end section is located at a suspending position away from the second end section of the housing, and the EAP sheet is displaceable bidirectionally with the suspending position as a midpoint of reciprocating motion when a positive voltage is applied and when a negative voltage is applied.

7. The camera module according to claim 2, wherein a bridge connection is made with a high thermal conductor sheet having a heat dissipating function between the image pickup device and the second end section of the housing.

8. The camera module according to claim 7, wherein the high thermal conductor sheet is used commonly as power supply grounding wiring for the image pickup device.

9. The camera module according to claim 2, further comprising:
 a measurement section configured to measure a distance between the image pickup device and the second end section of the housing; and
 a control section configured to use moving distance information obtained by the measurement section and signal information provided by the image pickup device to perform a focusing control of an object by giving a feedback to the voltage to be applied to the movable element.

10. The camera module according to claim 1, wherein the image pickup device has a radio transmission function configured to transmit information obtained by taking an image wirelessly.

11. The camera module according to claim 1, wherein the image pickup device is mounted on a support substrate, and a part of the support substrate is fixed to the movable joint section.

12. A camera apparatus having a camera module configured to take an object image, the camera module comprising:
 a lens;
 an image pickup device arranged on an optical axis of the lens; and
 an actuator section configured to reciprocate the image pickup device in an optical axis direction of the lens,
 wherein the actuator section includes
 a movable joint section on which the image pickup device is fixed,
 a parallel link mechanism section having a movable end section attached to the movable joint section and a mounting end section, and
 a movable element that is configured to perform displacement motion by a displacement amount depending on a level of a voltage to be applied and that is coupled to a coupling region between the movable joint section and the movable end section of the parallel link mechanism section in such a manner that the displacement motion is transmittable.

13. The camera apparatus according to claim 12, further comprising a housing having a first end section and a second end section, wherein
 the lens is arranged on a side of the first end section of the housing, and
 the image pickup device and the actuator section are arranged on a side of the second end section of the housing.

14. The camera apparatus according to claim 13, further comprising:
 a driving section configured to perform a drive control of the camera module; and
 a signal processing section configured to process a signal from the camera module,
 wherein the driving section includes
 a measurement section configured to measure a distance between the image pickup device and the second end section of the housing, and
 a control section configured to use moving distance information obtained by the measurement section and signal information provided by the image pickup device to perform a focusing control of an object by giving a feedback to the voltage to be applied to the movable element.

\* \* \* \* \*